(12) United States Patent
Fukuchi

(10) Patent No.: US 8,699,345 B2
(45) Date of Patent: Apr. 15, 2014

(54) COMMUNICATION CONTROL APPARATUS AND SHAPING APPARATUS HAVING TOKEN BUCKET

(75) Inventor: Rui Fukuchi, Chiba (JP)

(73) Assignee: MegaChips Corporation, Osaka-shi (JP)

( * ) Notice: Subject to any disclaimer, the term of this patent is extended or adjusted under 35 U.S.C. 154(b) by 365 days.

(21) Appl. No.: 13/151,829

(22) Filed: Jun. 2, 2011

(65) Prior Publication Data

US 2011/0299397 A1 Dec. 8, 2011

(30) Foreign Application Priority Data

Jun. 4, 2010 (JP) ................................. 2010-128734

(51) Int. Cl.
*G06F 11/00* (2006.01)
*H04J 1/16* (2006.01)
*H04L 1/00* (2006.01)

(52) U.S. Cl.
USPC ........................................ 370/235; 370/235.1

(58) Field of Classification Search
CPC ....................................................... H04L 47/00
USPC .......... 370/235, 468, 395.41, 395.42, 395.43, 370/235.1
See application file for complete search history.

(56) References Cited

U.S. PATENT DOCUMENTS

| | | | | |
|---|---|---|---|---|
| 7,280,477 B2 * | 10/2007 | Jeffries et al. | ................. | 370/235 |
| 7,697,844 B2 * | 4/2010 | Guo et al. | ....................... | 398/69 |
| 7,986,629 B1 * | 7/2011 | Ferguson et al. | ............. | 370/235 |
| 8,238,246 B2 * | 8/2012 | Ferguson et al. | ............. | 370/235 |
| 8,503,304 B2 * | 8/2013 | Ferguson et al. | ............. | 370/235 |
| 2003/0065809 A1 * | 4/2003 | Byron | .......................... | 709/232 |
| 2003/0095551 A1 | 5/2003 | Gotoh et al. | | |
| 2003/0174649 A1 * | 9/2003 | Shankar et al. | ............... | 370/235 |
| 2004/0062259 A1 * | 4/2004 | Jeffries et al. | ................. | 370/412 |
| 2005/0175014 A1 * | 8/2005 | Patrick | ..................... | 370/395.43 |
| 2007/0147422 A1 * | 6/2007 | Urano et al. | .................. | 370/468 |
| 2007/0212071 A1 * | 9/2007 | Guo et al. | ....................... | 398/69 |
| 2007/0223375 A1 * | 9/2007 | Ohta et al. | .................... | 370/230 |
| 2009/0213734 A1 * | 8/2009 | Hashinaga et al. | ........... | 370/235 |

FOREIGN PATENT DOCUMENTS

JP 2004-336549 A 11/2004

OTHER PUBLICATIONS

P.F. Chimento, "Standard Token Bucket Terminology", pp. 1-2, May 18, 2000.

* cited by examiner

*Primary Examiner* — Chuong T Ho
(74) *Attorney, Agent, or Firm* — Oblon, Spivak, McClelland, Maier & Neustadt, L.L.P.

(57) ABSTRACT

Various exemplary shaping apparatuses for shaping packets stored in queues are provided. The shaping apparatus includes a token bucket that accumulates tokens with a predetermined rate. When a number of tokens accumulated in the token bucket is equal to or larger than a reference number corresponding to a maximum packet length that the queues may store, the shaping apparatus allows one of the packets stored in the queues to transmit and subtracts a number of tokens corresponding to a length of the packet allowed to be transmitted. Various exemplary communication control apparatuses that incorporate the shaping apparatuses are also provided.

6 Claims, 4 Drawing Sheets

COMMUNICATION CONTROL APPARATUS AND SHAPING APPARATUS HAVING TOKEN BUCKET

The application claims benefit of Japanese Application No. JP-A-2010-128734. The disclosure of the prior application is hereby incorporated by reference in its entirety.

BACKGROUND

This invention relates to communication control apparatuses and shaping apparatuses that may be incorporated in the communication control apparatuses.

In data communication fields, shaping method is known as a method to prevent an exclusive or excessive use of communication bands by an particular user and to ensure a fair allocation of the communication bands to a plurality of users. The shaping method may be performed by using a token bucket, as described in, for example, P. F. Chimento, "Standard Token Terminology", May 18, 2000, retrieved from the Internet at <http://qbone.internet2.edu/bb/Traffic.pdf>.

That is, tokens are accumulated in a token bucket with a rate equivalent to a communication rate, and a length of a packet that is requested to be transmitted and stored in a queue is compared with the number of tokens accumulated in the token bucket. When the number of tokens accumulated in the token bucket is equal to or larger than a length, or a number of bytes, of the packet, the packet requested to be transmitted is allowed to transmit. Then, the number of tokens corresponding to the length of the packet allowed to be transmitted is subtracted from the tokens in the token bucket.

When a length of the packet requested to be transmitted is larger than the number of tokens in the token bucket, on the other hand, the packet is discarded or delayed until a sufficient number of tokens are accumulated in the token bucket. Accordingly, allocation of communication bands to a particular user is limited and an exclusive or excessive use of communication bands by the particular user is prevented.

When a plurality of queues is provided, it is known to provide one token bucket for each of the queues as described in, for example, Japanese Patent Publication JP 2004-336549.

Packets are stored in respective queues according to their attributions such as classes, source ports, destination ports, source addresses, destination addresses, and so on, where a plurality of queues may have some of the attributions in common. When shaping the packets in accordance with the attributions, shaping apparatuses may have token buckets for respective common attributions. The shaping apparatus compares lengths of packets stored in the queues, which are provided for storing packets having the common attribution, with the number of tokens in the token bucket and allows or refuses to transmit the packets in the queues.

FIG. 4 is a schematic drawing that shows a construction of a conventional shaping apparatus 500. The shaping apparatus 500 includes a shaping block 510 and an arbitration block 520. The shaping block 510 has a token bucked that accumulates tokens with a rate equal to a communication rate, comparators 512-515, and gates 516-519. Each of the comparators 512-515 compares a length of a packet requested to be transmitted, which is supplied from corresponding one of the queues 251-254 of the common attribution, and the number of tokens accumulated in the token bucket. The gates 516-519 allow the packets having lengths less than the number of tokens to be transmitted to the arbitration block 520.

The arbitration block 520 arbitrates the packets received through the gates 516-519 according to a predetermined policy to select one of the packets to transmit, and informs the token bucket of a length of the selected packet. The token bucket subtracts the number of tokens corresponding to the informed length of packet from the tokens in the bucket.

When transmission requests are generated for packets stored in the queues 251-254, the comparators 512-515 of the shaping apparatus 500 compare the lengths of packets requested to be transmitted and the number tokens accumulated in the token bucket 511. One or more of gates 516-519 corresponding to the comparators that detect that lengths of corresponding packets are less than the number of tokens in the token bucket open and allow corresponding packets to be transmitted to the arbitration block 520.

When two or more of the packets are allowed to be transmitted, the arbitration block 520 arbitrates the two or more of the packets and selects one of them to be transmitted, and informs the token bucket 511 of the length of the selected packet. The token bucket 511 subtracts the number of tokens corresponding to the informed length from the tokens in the token bucket. When only one of the gates 516-519 allows the corresponding packet to be transmitted to the arbitration block 520, the arbitration block 520 does not arbitrate and informs the token bucket 511 of a length of the packet.

In the shaping apparatus 500 shown in FIG. 4 where a token bucket 511 is provided for a plurality of queues 251-254, the same number of comparators 512-515 as the number of queues 251-254 are required. Moreover, signal interconnections between the token bucket 511 to each of the comparators 512-515 are required to inform the number of tokens in the token bucket 511. Signal interconnections between the queues 251-254 to corresponding comparators 512-515 are also required to inform sizes of packets stored in the queues 251-254. Accordingly, the token bucket 511 and queues 251-254 have heavy signal loads, or interconnection loads.

Furthermore, a large number of shaping apparatuses 500 are required when an available number of attributions increases. Accordingly, construction of an integrated circuit having a required number of shaping apparatuses requires an extremely large circuit area and signal loads.

SUMMARY

It would be advantageous to provide communication control apparatuses and shaping apparatuses that can effectively reduce circuit areas and signal loads.

This disclosure provides communication control apparatuses and shaping apparatuses that require only one comparator in each of the shaping apparatuses even if each of the shaping apparatuses includes a token bucket provided to shape packets stored in a plurality of queues. This disclosure further provides communication control apparatuses and shaping apparatuses in which each of the comparators compares a fixed number and the number of tokens accumulated in a token bucket.

Various exemplary embodiments of this disclosure provide communication control apparatuses for shaping packets stored in a plurality of queues that are grouped in a plurality of groups of queues. The communication control apparatus may include shaping apparatuses provided for respective ones of the groups of queues. Each of the shaping apparatuses may include a shaping block that includes a token bucket that accumulates tokens with a predetermined rate and a comparator. Each of the groups of queues may include one or more of the plurality of queues that may store one or more packets having lengths equal to or less than a maximum packet length. When the one or more of the queues of a first one of the groups of queues store one or more packets and the comparator in a first one of the shaping apparatuses provided for the first one of the groups of queues detects that a number of the tokens accumulated in the token bucket in the first one of the shaping apparatuses is equal to or larger than a reference number corresponding to the maximum packet length, the first one of the shaping apparatuses may allow one of the one or more packets to transmit. The first one of the shaping apparatuses may further subtract a consumed number of tokens corresponding to a length of the one of the packets from the tokens in the token bucket in the first one of the shaping apparatuses.

Various exemplary embodiments of this disclosure provide shaping apparatuses for shaping one or more packets stored in one or more queues. The shaping apparatus may include a shaping block including a token bucket that accumulates tokens with a predetermined rate and a comparator. The one or more queues may store one or more packets having lengths equal to or less than a maximum packet length. When the one or more queues store one or more packets and the comparator detects that a number of the tokens accumulated in the token bucket is equal to or larger than a reference number corresponding to the maximum packet length, the shaping apparatus may allow one of the one or more packets stored in the one or more queues to transmit and subtract a consumed number of tokens corresponding to a length of the one of packets from the tokens in the token bucket.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

<1st Exemplary Embodiment>

Figure 1:
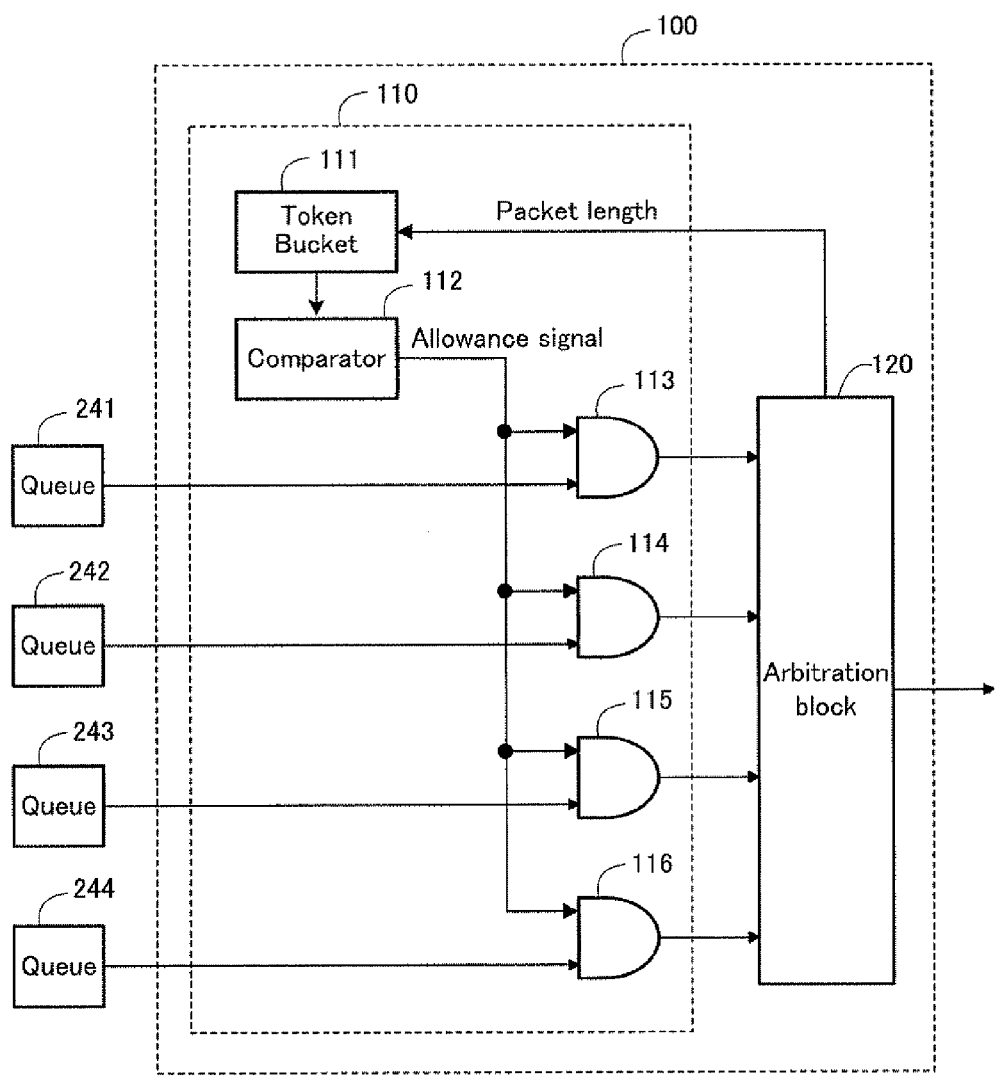
FIG. 1 is a functional block diagram of an exemplary shaping apparatus according to a first embodiment of this disclosure.

FIG. 1 shows a plurality of queues 241-244 that store packets requested to be transmitted. FIG. 1 also shows a construction of an exemplary shaping apparatus 100 according to a first exemplary embodiment of this disclosure. The queues 241-244 constitute a group of queues for storing packets having the same attribution. The packets have lengths, or number of bytes, equal to or less than the maximum length determined by the communication standard such as Ethernet, PON (passive optical network), or the like. Accordingly, each of the queues 241-244 may store a packet having a length equal to or less than the maximum packet length determined by the communication standard.

The shaping apparatus 100 includes a shaping block 110 and a arbitration block 120. The shaping block 110 includes a token bucket 111 to which tokens are accumulated with a rate equal to a communication rate, a comparator 112, and gates 113-116. The comparator 112 compares a number of the tokens in the token bucket 111 and a reference number, which may be set to a number corresponding to the maximum packet length that the queues may store. The comparator supplies an allowance signal to the gates 113-116 when the number of tokens accumulated in the token bucket 111 is equal to or larger than the reference number. Thereby, the gates allow the packets stored in corresponding queues to be transmitted to the arbitration block 120. The gates 113-116 may be constructed with, for example, AND gates.

The arbitration block 120 arbitrates the packets received through the gates, or packets allowed by the gates to be transmitted to the arbitration block, in accordance with a predetermined policy to select one of the packets. The arbitration block 120 further informs the token bucket 111 of the length of the selected packet. The token bucket 111 subtracts a number of tokens corresponding to the informed length from the tokens in the token bucket.

According to this exemplary embodiment, when transmission requests for one or more packets stored in one or more of the queues 241-244 are generated, the shaping apparatus 100 determines, by using the comparator 112, if the number of tokens currently stored in the token bucket 111 is equal to or larger than the maximum packet length. When the number of tokens is equal to or larger than the maximum packet length, an allowance signal is supplied to the gates 113-116 and the packets, which are requested to be transmitted and stored in the queues 241-244, are allowed to be transmitted to the arbitration block 120.

When two or more packets are transmitted, the arbitration block 120 arbitrates the packets to transmit one of them, and informs the token bucket 111 of the length of the transmitted packet. The token bucket 111 subtracts a number of tokens corresponding to the informed packet length from the tokens in the token bucket. When the number of tokens accumulated in the token bucket 111 is less that the maximum packet length, the packets requested to be transmitted are discarded or delayed until a sufficient number of tokens are accumulated in the token bucket.

According to the first exemplary embodiment of this disclosure, as explained above, only one comparator is required because it is not necessary to compare lengths of one or more packets requested to be transmitted and the number of tokens in the token bucket. Further, a construction of the comparator can be simplified because the reference number, or a number corresponding to the maximum packet length, used in the comparison is constant. The signal loads can also be reduced because interconnections from respective queues 241-244 to the comparator 112 for informing the lengths of packets stored in the queues are unnecessary.

Construction of the comparator can further be simplified by setting the reference number, or the number corresponding to the maximum packet length, to $2^m$ where m is a positive integer.

<2nd Embodiment>

Figure 2:
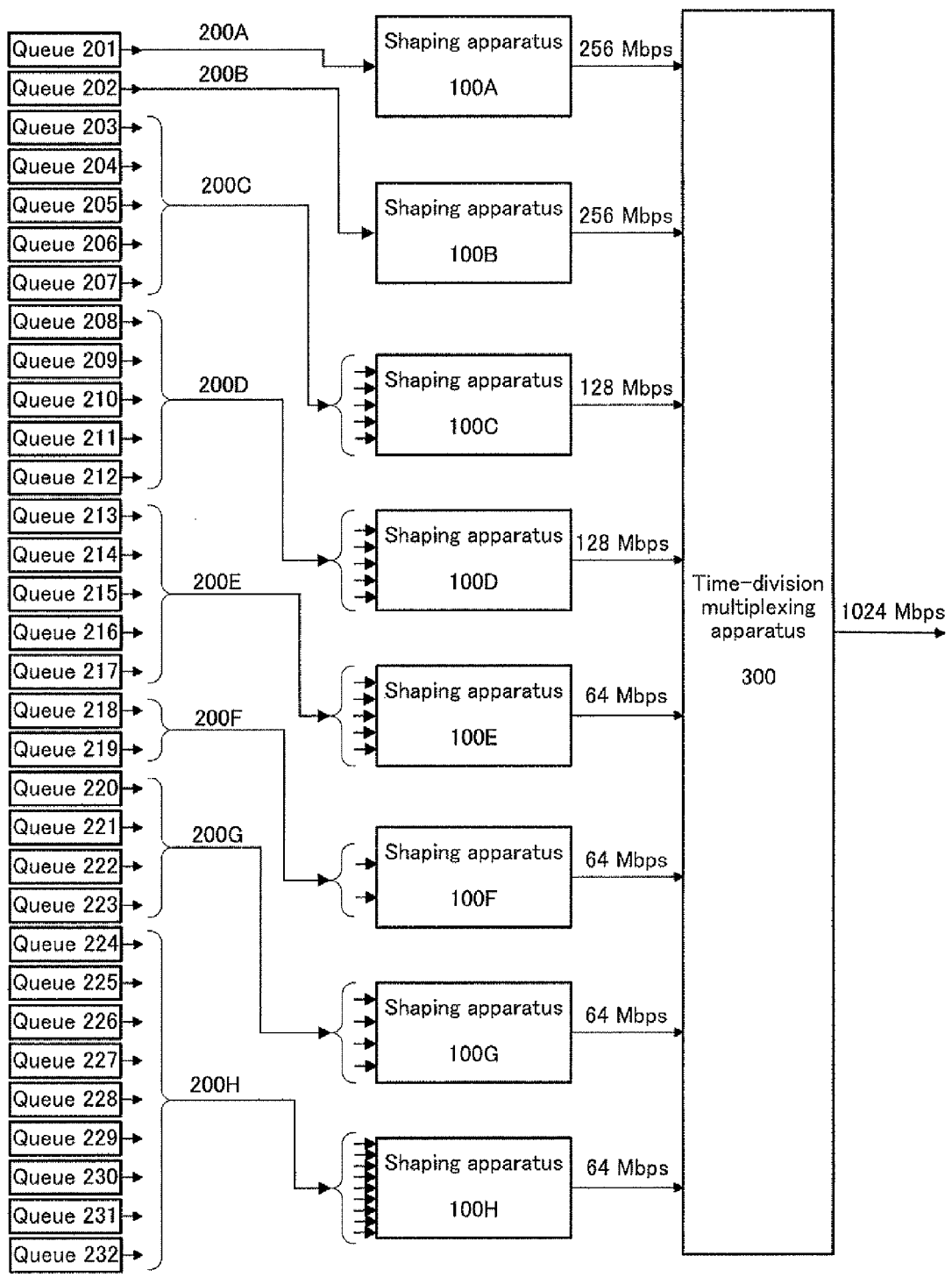
FIG. 2 is a functional block diagram of an exemplary communication control apparatus according to a second embodiment of this disclosure.

FIG. 2 shows a construction of an exemplary communication control apparatus according to a second exemplary embodiment of this disclosure. According to this embodiment, 32 queues 201-232 are grouped in the first to the eighth group 200A-200H according to, for example, bridge ports to which the queues belong. The bridge ports may be, for example, WAN/LAN ports. Token accumulation rates for respective groups determine the communication rates allowed for respective WAN/LAN ports or users.

Numbers of queues belonging to respective groups may be different with each other. A single queue may form a group, while a plurality of queues may be allocated to a group. Because the communication rates are set for respective groups, queues in groups with small number of queues likely to have high communication rates. The service to be provided determines the actual grouping of the queues.

In the example shown in FIG. 2, a queue 201 in a first group 200A is allocated to a first shaping apparatus 100A, a queue 202 in a second group 200B is allocated to a second shaping apparatus 100B, queues 203-207 in a third group 200C are allocated to a third shaping apparatus 100C, queues 208-212 in a fourth group 200D are allocated to a fourth shaping apparatus 100D, queues 213-217 in a fifth group 200E are allocated to a fifth shaping apparatus 100E, queues 218-219 in a sixth group 200F are allocated to a sixth shaping apparatus 100F, queues 220-223 in a seventh group 200G are allocated to a seventh shaping apparatus 100G, and queues 224-232 in a eighth group 200H are allocated to a eighth shaping apparatus 100H, respectively. The maximum lengths of packets that the queues in each of the groups may store are the same, while the maximum lengths that the queues in different groups may store may be different with each other.

The reference number for the comparator in the shaping apparatus 100A may be set to a number corresponding to the maximum packet length that the queue 201 may store, the reference number for the comparator in the shaping apparatus 100B may be set to a number corresponding to the maximum packet length that the queue 202 may store, the reference number for the comparator in the shaping apparatus 100C may be set to a number corresponding to the maximum packet length that the queues 203 to 207 may store, the reference number for the comparator in the shaping apparatus 100D may be set to a number corresponding to the maximum packet length that the queues 208-212 may store, the reference number for the comparator in the shaping apparatus 100E may be set to a number corresponding to the maximum packet length that the queues 213-217 may store, the reference number for the comparator in the shaping apparatus 100F may be set to a number corresponding to the maximum packet length that the queues 218-219 may store, the reference number for the comparator in the shaping apparatus 100G may be set to a number corresponding to the maximum packet length that the queues 220-223 may store, and the reference number for the comparator in the shaping apparatus 100H may be set to a number corresponding to the maximum packet length that the queues 224-232 may store, respectively The communication rates of the first and the second shaping apparatuses 100A and 100B may be set to 256 Mbps, the communication rates for the third and the fourth shaping apparatuses 100C and 100D may be set to 128 Mbps, the communication rates of the fifth through the eighth shaping apparatuses 100E-100H may be set to 64 Mbps, respectively. Tokens are accumulated in the token buckets in respective shaping apparatuses with corresponding rates.

The communication control apparatus shown in FIG. 2 further includes a time-division multiplexing apparatus 300. The time-division multiplexing apparatus 300 arranges the packets that the arbitration blocks in respective shaping apparatuses selected in the time-domain and transmits the arranged packets with a total communication rate of 1024 Mbps.

FIG. 2 shows an exemplary communication control apparatus in which one, one, five, five, five, two, four, and nine of 32 queues 201-232 are allocated to eight shaping apparatuses 100A-100H. It is preferable that the allocation is not fixed, but can be flexibly modified depending on services to be provided. In order to increase the flexibility, each of eight shaping apparatuses 100A-100H may preferably be constructed to be able to receive packets from up to 32 queues.

Figure 4:
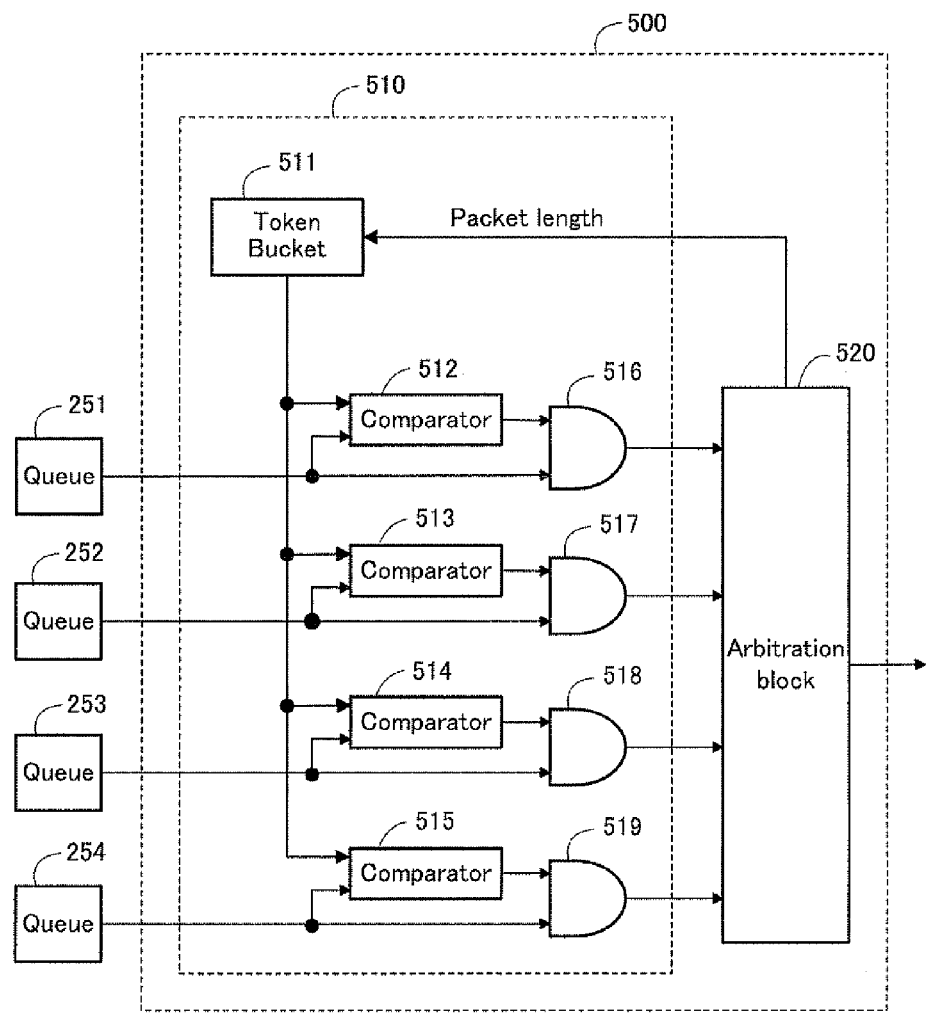
FIG. 4 is a functional block diagram of a conventional shaping apparatus.

The conventional shaping apparatus shown in FIG. 4 needs to have 32 comparators in order to receive packets from 32 queues, or 32×8=256 comparators in total to construct the communication control apparatus shown in FIG. 2. On the other hand, the exemplary shaping apparatus shown in FIG. 1, which has only one comparator, can receive packets from an arbitrary number of queues. Accordingly, eight comparators in total can construct the communication control apparatus shown in FIG. 2.

That is, when constructing communication control apparatus having shaping apparatuses each capable to receive packets from up to 32 queues, the exemplary shaping apparatus shown in FIG. 1 provides 1/32 reduction of the number of comparators compared with the conventional shaping apparatus shown in FIG. 4. The reduction of the number of comparators further provides a proportional reduction of the number of signal interconnections and signal loads. The ratio of reduction of the number of comparators and interconnections further increases when the number of groups or the number of queues in the communication control apparatus increases.

<3rd Exemplary Embodiment>

Figure 3:
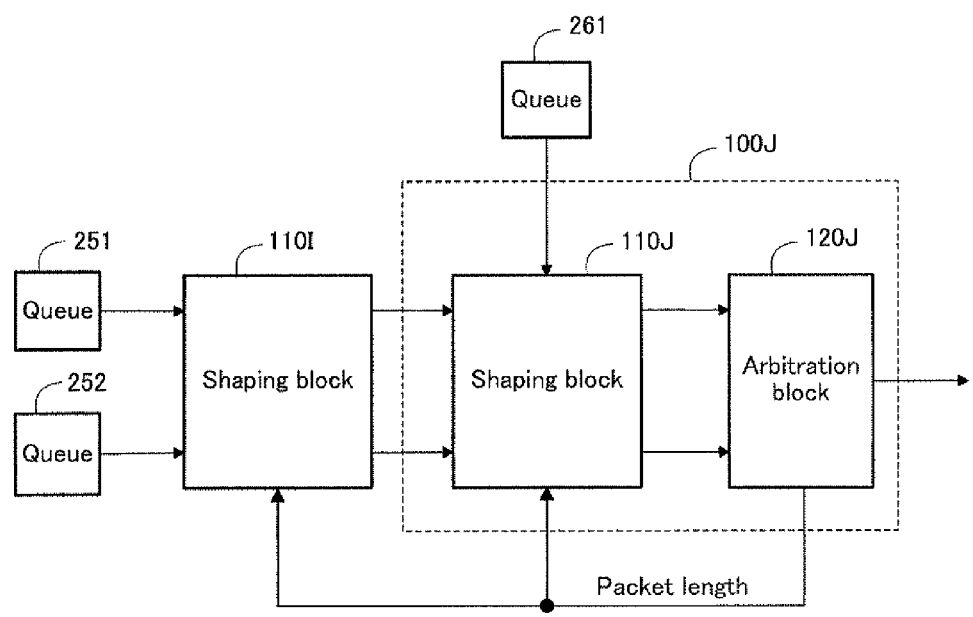
FIG. 3 is a functional block diagram of an exemplary communication control apparatus according to a third embodiment of this disclosure.

FIG. 3 shows an exemplary construction of a communication control apparatus according to a third exemplary embodiment of this disclosure. The exemplary communication control apparatus shown in FIG. 3 includes a first shaping block 110I that shapes packets stored in a first group of queues 251 and 252. The exemplary communication control apparatus also includes a second shaping block 110J and an arbitration block 120J that constitute a shaping apparatus 100J. The second shaping block 110J shapes the packets from the first shaping block 110I and a packet stored in a queue 261 in another group. The arbitration block 120J arbitrates the packets received from the second shaping block 110J.

The maximum packet lengths that the queues 251, 252, and 261 may store are the same. Reference numbers for the comparators in the shaping blocks 110I and 110J are set to be the same, which may correspond to the maximum packet length that the queues 251, 252, and 261 may store.

In the exemplary communication control apparatus shown in FIG. 3, the first shaping block 110I allows up to two packets to transmit, and the second shaping block 110J allows up to three packets to transmit. The arbitration block 120J arbitrates up to three packets from the second shaping block 110J and transmits one of the packets. The arbitration block 120J further informs the token buckets in the first and the second shaping blocks 110I and 110J of the length of the one of the packets. The token buckets in the first and the second shaping blocks 110I and 110J subtract a number of tokens corresponding to the informed length of the one of the packets from the tokens accumulated in the buckets.

Thus, in the exemplary communication control apparatus according to the third exemplary embodiment of this disclosure, the shaping apparatus 100J, which is provided to shape, i.e., to allow or refuse, transmissions of packets stored in a group of queues including the queue 261, further shapes packets stores in another group of queues 251 and 252. Here, the maximum packet lengths that the queues in the both groups may store are the same.

As explained above, according to various exemplary embodiments of this disclosure, a comparator of a shaping block simply compares a fixed number and the number of tokens accumulated in a token bucket. Accordingly, a construction of the comparator may be simplified. Further, each shaping apparatus only requires one comparator even if a token bucket is provided to shape packets stored in a plurality of queues. Moreover, interconnections from respective queues to inform the lengths of packets stored therein are not required. Accordingly, circuit areas and signal loads to construct semiconductor integrated circuits can be remarkably decreased.

What is claimed is:

1. A communication control apparatus for shaping packets stored in a plurality of queues that are grouped in a plurality of groups of queues, the communication control apparatus comprising:

shaping apparatuses provided for respective ones of the groups of queues, each of the shaping apparatuses including a shaping block that includes a token bucket that accumulates tokens with a predetermined rate and a comparator, wherein each of the groups of queues includes one or more of the plurality of queues that are configured to store one or more packets having lengths equal to or less than a maximum packet length, and when the one or more of the queues of a first one of the groups of queues store one or more packets and the comparator in a first one of the shaping apparatuses provided for the first one of the groups of queues detects that a number of the tokens accumulated in the token bucket in the first one of the shaping apparatuses is equal to or larger than a reference number corresponding to the maximum packet length, the first one of the shaping apparatuses allows one of the one or more packets to transmit and subtracts a consumed number of tokens corresponding to a length of the one of the packets from the tokens in the token bucket in the first one of the shaping apparatuses.

2. The communication control apparatus according to claim 1, wherein the first one of the shaping apparatuses further includes an arbitration block, the first one of the groups of queues includes two or more of the plurality of queues that are configured to store two or more packets having lengths equal to or less than the maximum packet length, and when the two or more of the queues store two or more packets and the comparator in the first one of the shaping apparatuses detects that the number of the tokens accumulated in the token bucket in the first one of the shaping apparatuses is equal to or larger than the reference number, the arbitration block i) receives the two or more packets, ii) selects one of the received packets to transmit, and iii) informs the token bucket in the first one of the shaping apparatuses of a length of the selected one of the packets so that the consumed number of tokens corresponding to the length of the selected one of the packets is subtracted from the tokens.

3. The communication control apparatus according to claim 1, wherein the shaping apparatuses include a second one of the shaping apparatuses provided for a second one of the groups of queues that are configured to store one or more packets having lengths equal to or less than the same maximum packet length, the second one of the shaping apparatuses includes a second shaping block that includes a second token bucket that accumulates tokens with a second predetermined rate and a second comparator, the second one of the shaping apparatuses receives, when the comparator in the first one of the shaping apparatuses detects that the number of the tokens accumulated in the token bucket in the first one of the shaping apparatuses is equal to or larger than the reference number, the one or more packets from the first one of the shaping apparatuses, and when the one or more of the queues of the second one of the groups of queues store second one or more packets and the second comparator detects that a number of the tokens accumulated in the second token bucket is equal to or larger than the reference number, the second shaping block allows to transmit both of i) the one or more packets received from the first one of the shaping apparatuses and ii) the second one or more packets stored in the second one of the groups of queues.

4. The communication control apparatus according to claim 3, wherein the second one of the shaping apparatuses further includes a second arbitration block that receives, when the second shaping block allows to transmit, the one or more packets received from the first one of the shaping apparatuses and the second one or more packets stored in the second one of the groups of queues, and the second arbitration block i) selects one of the received packets to transmit, and ii) informs the token bucket and the second token bucket of a length of the selected one of the packets so that the consumed number of tokens corresponding to the length of the selected one of the packets is subtracted from the tokens in the token bucket and in the second token bucket.

5. A shaping apparatus for shaping one or more packets stored in one or more queues, the shaping apparatus comprising:

a shaping block including a token bucket that accumulates tokens with a predetermined rate and a comparator, wherein, the one or more queues are configured to store one or more packets having lengths equal to or less than a maximum packet length, and when the one or more queues store one or more packets and the comparator detects that a number of the tokens accumulated in the token bucket is equal to or larger than a reference number corresponding to the maximum packet length, the shaping apparatus allows one of the one or more packets stored in the one or more queues to transmit and subtracts a consumed number of tokens corresponding to a length of the one of packets from the tokens in the token bucket.

6. The shaping apparatus according to claim 5, wherein the one or more queues include two or more queues that are configured to store two or more packets having lengths equal to or less than the maximum packet length;

the shaping apparatus further includes an arbitration block, and when the two or more queues store two or more packets and the comparator detects that the number of the tokens accumulated in the token bucket is equal to or larger than the reference number, the arbitration block i) receives the two or more packets, ii) selects one of the two or more packets to transmit, and iii) informs the token bucket of a length of the selected one of the packets so that the consumed number of tokens corresponding to the length of the selected one of the packets is subtracted from the tokens.

* * * * *